United States Patent Office 3,447,897
Patented June 3, 1969

3,447,897
PROCESS FOR REMOVING POLYVALENT METAL IMPURITIES FROM LITHIUM ALUMINATE
Robert J. Moolenaar, Midland, Mich., and Marshall P. Neipert, Lake Jackson, Tex., assignors to The Dow Chemical Company, Midland, Mich., a corporation of Delaware
No Drawing. Filed Oct. 5, 1966, Ser. No. 584,351
Int. Cl. C01f 7/04
U.S. Cl. 23—52                    7 Claims

ABSTRACT OF THE DISCLOSURE

Lithium aluminate contaminated with polyvalent metal compounds whose hydroxides are insoluble in aqueous alkali are purified by dissolving the lithium aluminate in alkali at a temperature of 145° C. or above, separating the insoluble ingredient, cooling the so separated liquid below 95° C. to crystallize the lithium aluminate and recovering the purified lithium aluminate.

---

This invention relates to a method for purifying a lithium aluminate complex and more particularly pertains to a method of purifying a lithium aluminate complex by dissolving it in an aqueous alkali metal hydroxide at an elevated temperature above about 100° C. separating the liquid from the remaining solid phase, cooling the liquid below about 90° C. and recovering the purified lithium aluminate complex from the solution.

"Lithium aluminate complex" means the hydrated lithium aluminate composition containing lithium and aluminum in atomic ratios of 1 Li:1–3.5 Al. The "lithium aluminate complex" can be obtained from saline brine or from natural ores, representatives of which are spodumene, lepidolite and amblygonite.

Lithium aluminate complex is useful as an ingredient for making special glass and high strength ceramics. In these uses the desired Al/Li weight ratio is less than 9 to 1. Crude lithium aluminate complex usually contains a much higher Al/Li ratio and is frequently contaminated with calcium, magnesium, iron and other impurities which are undesirable for many uses, including those specifically mentioned above. A satisfactory natural source of comparatively pure lithium aluminate complex for the preparation of the special glass and high strength ceramics is petalite. It, however, is available in a very limited geographical area of the world.

Prior processes for obtaining synthetic lithium aluminate complex of the desired purity require the use of carefully purified lithium and aluminum salts which are reacted to form a water-soluble lithium aluminate complex under controlled, slightly acid or slightly alkaline conditions and thereafter the complex is given a further treatment to remove the undesired ionizable ingredients which comprised part of the starting materials. Typical methods of making the lithium aluminate complex is to react aqueous solutions of LiCl, LiNO$_3$, LiOH, or Li$_2$SO$_4$ or any other water-soluble lithium compound, with aqueous solutions of Al$_2$(SO$_4$)$_3$, AlCl$_3$, Al(NO$_3$)$_3$ or suspensions of Al(OH)$_3$ or other water-soluble or water-dispersible, ionizable aluminum compounds. The reaction can be effected between the freezing and boiling points of the respective solutions or mixtures under the pressure conditions employed.

We have now found, quite unexpectedly, that if the crude lithium aluminate complex, obtained by one of the processes described above, is heated in a strong aqueous solution of an alkali metal hydroxide to a temperature above 100° C., and preferably to 170–200° C., the lithium aluminate complex or its disproportionated derivatives are dissolved, but the polyvalent metal hydroxides formed in the system remain insoluble. On filtration or centrifuging of the hot solution, the insoluble hydroxides are separated from the lithium aluminate complex, and the latter begins to precipitate from the aqueous alkali metal hydroxide solution when the temperature is lowered to about 95° C. and below. Only traces of other alkali metal salt contaminants remain in solution after completion of the precipitation of the lithium aluminate complex.

The Al/Li molar ratios in the reaction system can be varied quite widely, but the ratio of the purified lithium aluminate remains fairly uniform, at about 2 to 3 Al for each mol of Li. The molar ratio of alkali to Al can range from about 1.6 to 13 or more, but it is essential that sufficient alkali be present to dissolve the lithium aluminate. It is preferred to use 2.0 to 3.6 mols alkali per mol of Al. A lithium aluminate complex containing 2 to 2.3 mols Al per mol of Li, is readily obtained by keeping the molar concentration of Al below about 10 per mol Li.

Temperatures of 170° C. or higher for the dissolution step are preferred because of the increase in solubility of the lithium and aluminate-containing ingredients with increase in temperature. Since the reaction is ionic in nature, it is complete in a short time. Reaction pressure has no particular effect on the preparation of the lithium aluminate complex, so that the manufacture can be run at autogenous pressure at the temperature employed.

However, because high temperatures have favorable solubility effect, it is preferred to operate at elevated pressures. In addition, caustic requirements may be lower at the higher temperatures.

There is some indication that where large excesses of alkali are present crystallization tends to be fairly slow. In some tests where alkali concentration in the solution was above 12% by weight and aluminum concentration was below 10 g. per liter, periods as long as four days were needed to effect complete precipitation of purified lithium aluminate, where large excesses of alkali were present. Usually, with the preferred concentration of alkali, precipitation of the purified material is complete in about two hours.

The purified lithium aluminate complex can be separated from the liquid by any suitable means, such as filtration, centrifuging or decantation. The filtrate which contains some dissolved sodium aluminate and dissolved alkali is recycled for alkalinity adjustment for treating successive amounts of the crude lithium aluminate.

The examples which follow are intended to illustrate, but not to limit the invention. All parts are given by weight, unless specifically indicated otherwise.

Example 1

The apparatus used in this and subsequent runs was a mild steel pressure vessel of 1-liter capacity equipped with a filter and a mild steel reservoir for collecting the filtrate. After charging the vessel, it was immersed in an oil bath and heated to the temperature desired.

Crude lithium aluminate containing .12% Fe, 5.5% Al, 0.4% Li, 0.3% Mg, 0.2% Ca, 4% Cl⁻ and the remainder primarily oxygen and water with only traces of other contaminants, was employed as a starting material.

A mixture of 450 g. of the crude lithium aluminate complex, 102 g. NaOH, and 230 g. H$_2$O was placed in the pressure vessel and heated to 180° C. for one hour. The Al/Li weight ratio in the charge was 13.75 to 1 and the NaOH/Al mol ratio was 3.3. The mixture was filtered hot through asbestos fibers supported on a steel screen. The filtrate was permitted to cool to about 25° C. On standing, purified lithium aluminate complex precipitated from the filtrate. The crystals were dried until they were moisture free. On analysis, the dry crystals were found to contain 3.4% Li, 27.3% Al, about 0.1% Cl and only very small amounts, in the range of .01–.02% of Ca, Mg and Fe. The Al/Li weight ratio of the dry crystals was 8 to 1. The filtrate from the final purification can be used after alkalinity adjustment for dissolving another batch of crude lithium aluminate.

Example 2

The starting materials for this run consisted of 19.3 g. freshly prepared Al(OH)$_3$, 126 g. of the crude lithium aluminate, 67.6 g. NaOH and 193 g. H$_2$O. The charged reactor was heated to 180° C. for 16 hours and then the reaction mixture was filtered hot. On cooling to 25° C. and standing for about two hours, the precipitation of purified lithium aluminate was complete. The precipitate was recovered and dried. Nine g. of dry crystals analyzing 27% Al, 3.2% Li, less than 0.1% Cl and mere traces of Ca, Mg and Fe, were obtained. In this run the Al/Li weight ratio was 33 to 1 in the initial charge and 8.3 to 1 in the purified crystals.

Example 3

The procedure of Example 1 was repeated with the exception that the mixture was heated to 145° C. for 16 hours. The purified crystals had an Al/Li weight ratio of 8.2 to 1. The analysis of the purified lithium aluminate was essentially the same as that of Example 1. The main difference in this example from that of Example 1 is that the solubility of the lithium aluminate in the aqueous alkali is somewhat lower at 145° C. than at 180° C.

We claim:

1. A method of purifying crude lithium aluminate containing polyvalent metal contaminants whose hydroxides are insoluble in aqueous alkali, comprising dissolving said aluminate in an aqueous alkali metal hydroxide solution containing at least about 1.6 mols of said hydroxide per mol of Al at a temperature above about 145° C., separating the liquid from the solid phase, cooling the separated liquid phase below about 95° C. to effect precipitation of purified lithium aluminate and recovering the so purified lithium aluminate.

2. The method of claim 1 in which the alkali metal hydroxide is NaOH.

3. The method of claim 1 in which the molar ratio of alkali ranges from about 1.6 to 3.6 per mol Al in the reaction mixture.

4. The method of claim 1 in which the liquid remaining from the recovery of the purified lithium aluminate is recycled for dissolving crude lithium aluminate.

5. The method of claim 1 in which the temperature for dissolving the crude lithium aluminate is at least about 180° C.

6. The method of claim 1 in which the alkali metal hydroxide solution of purified lithium aluminate is cooled to a temperature of at least about 25° C.

7. The method of claim 2 in which
   (a) the molar ratio of NaOH to Al is 1.6 to 3.6 mols NaOH per mol Al,
   (b) the molar ratio of Al to Li is 1 to 10 mols Al per mol Li,
   (c) the temperature for dissolving the crude lithium aluminate is above 145° C.,
   (d) the crystallization of purified lithium aluminate is not higher than about 25° C., and
   (e) the purified product contains less than nine parts by weight Al per part of Li.

References Cited

UNITED STATES PATENTS

| | | | |
|---|---|---|---|
| 2,442,226 | 5/1948 | Wall | 23—52 |
| 2,519,362 | 8/1950 | Flint et al. | 23—52 |
| 2,926,069 | 2/1960 | Perrin et al. | 23—52 |

HERBERT T. CARTER, *Primary Examiner.*